June 11, 1957 W. G. PFANN 2,795,742

SEMICONDUCTIVE TRANSLATING DEVICES UTILIZING SELECTED NATURAL GRAIN BOUNDARIES

Filed Dec. 12, 1952 2 Sheets-Sheet 1

INVENTOR
W. G. PFANN
BY Edwin B. Cave
ATTORNEY

INVENTOR
W. G. PFANN
BY Edwin B. Cave
ATTORNEY

United States Patent Office 2,795,742

Patented June 11, 1957

2,795,742

SEMICONDUCTIVE TRANSLATING DEVICES UTILIZING SELECTED NATURAL GRAIN BOUNDARIES

William G. Pfann, Basking Ridge, N. J., assignor to Bell Telephone Laboratories, Incorporated, New York, N. Y., a corporation of New York Application December 12, 1952, Serial No. 325,525

2 Claims. (Cl. 317—235)

This invention relates to semiconductor translating devices and to processes for manufacturing the same.

When the processes herein described are used in the manufacture of semiconductive translating devices, highly stable, highly sensitive devices result. The processes of this invention are simple and do not involve complicated equipment and procedures for controlling the semiconductive properties of the material from which the devices are constructed. By starting with ingots of semiconductive materials produced by the reduction of commercially available oxides, bodies of semiconductive materials containing NPN grain boundaries are selected. Such portions, when utilized in the configurations described, result in devices having characteristics of the order of those reported for transistors made from materials containing artificially-produced junctions. The devices here described are particularly suitable for high frequency applications by reason of their thin P regions.

The processes and devices of this invention are based on the natural occurrence of grain boundaries appearing in N-type germanium ingots prepared in an orthodox manner. Certain of these boundaries are "active" in that they have a high resistance in a direction normal to the boundary and behave like two rectifying PN barriers placed back to back with very thin intermediate P-type regions. Means for selecting such active boundaries are described herein.

Some electrical properties of natural grain boundaries occurring in germanium ingots have been reported in the literature; see for example, Journal of the American Physical Society, vol. 76, page 459, paragraph D6. The properties of such boundaries are believed to be due to a concentration of acceptor impurities at or near the boundaries thereby producing NPN configurations in N-type germanium and silicon ingots.

Wherever the term "natural" is used in the description or claims of this invention where reference is being made to a grain boundary, it is understood that the boundary to which reference is made is formed without direct intervention in the crystallizing ingot. That is, other than controlling the impurity content of the semiconductor material and the conditions under which the ingot is allowed to crystallize by normal freezing, no effort is made towards controlling the location or the electrical characteristics of the boundaries which occurred. Natural grain boundaries are to be distinguished from barriers which have been produced within single crystals of material such as, for example, by doping, and also from grain boundaries which have been produced synthetically as, for example, by sintering together two N-type bodies with an intermediate P layer.

In the description of this invention, reference is made to the electrical characteristics of the NPN grain boundaries in terms of the standard equivalent circuit values known to the art. A complete discussion of these equivalent circuit dimensions is found in "Electrons and Holes in Semiconductors" by W. Shockley (D. Van Nostrand and Co., New York), 1950 edition, page 37 et seq.

Since there are conflicting views as to the explanation of the reason for the occurrence of NPN boundaries in N-type ingots of germanium and silicon, no attempt will be made to describe that phase of solid state physics which deals with this particular manifestation. It suffices to state that these boundaries do not appear to occur naturally in P-type material and, further, that they behave as if there is a concentration of acceptors at the boundary. This behavior may be due to lattice defects, to "traps," or to the actual presence of acceptor impurities at the boundary. A complete discussion of traps in semiconductors is given in the above-cited book by W. Shockley.

In the manufacture of the semiconductor devices herein described, material containing NPN barriers of desirable characteristics is selected from ingots prepared in accordance with, for example, the process as described in "Crystal Rectifiers" by Torrey and Whitmer (McGraw-Hill), first edition, pages 364–369, or as described by H. C. Theuerer and J. H. Scaff in "Journal of Metals," volume 191, pages 59–63.

The resistivity of the ingot material is preferably of the order of 0.1 to 1 ohm-centimeters although higher purity materials of resistivities of up to 10 ohm-centimeters and greater are usable. Selection of material containing active boundaries may be made by one of the three following methods:

1. Selection may be by measurement of the photovoltage which method will be described below.

2. Selection may be made by use of two contact points straddling a grain boundary. The quantity so measured is $r_b$, the positive feedback impedance in the equivalent network for the transistor and is sometimes less than 10 ohms for natural grain boundaries.

3. Selection may be by means of resistivity measurements using the four-point probe method.

The experience of the inventor indicates that most active boundaries usable in the devices of this invention are curved. Straight-line boundaries, presumably a result of twinning, may or may not be active. Recent work in this field indicates that although first order twin boundaries are inactive, higher order twins may be sufficiently active to be useful in transistor structures.

For simplicity, the devices to be discussed and the processes to be utilized will be described in terms of germanium containing significant impurities.

The invention can be better understood by reference to the following drawings, in which.

Figure 10:
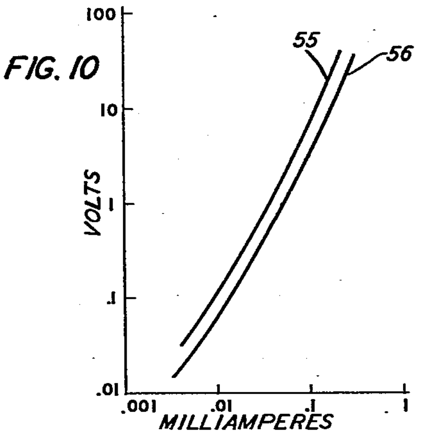
Figure 11:
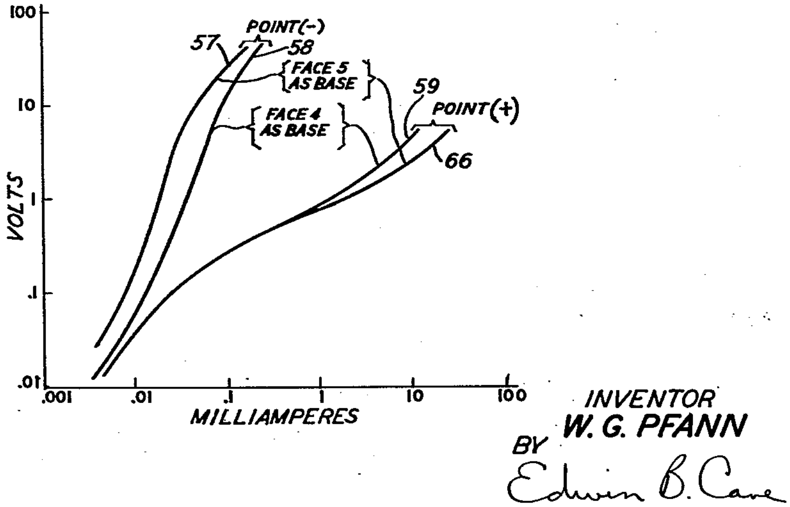

Fig. 10, on coordinates of volts against milliamperes, is a plot of the D. C. current-voltage characteristic of the specimen of Fig. 3;

Fig. 11, also on coordinates of volts against milliamperes, is a plot of the D. C. rectifying characteristic between the grain boundary and each end of the electrode of the device depicted in Fig. 4.

Figure 1:
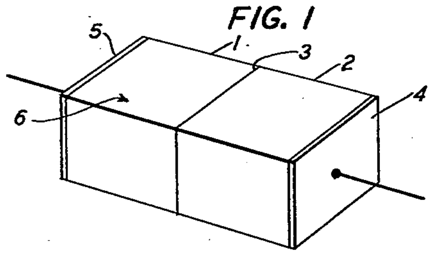
Fig. 1 is a perspective view of a device made from an active boundary specimen prepared in accordance with this invention.

Referring to Fig. 1, the particular device depicted is formed of a body of semiconductor material, such as germanium, which consists of two N-type conductivity regions 1 and 2 separated by a natural grain boundary consisting of a narrow P region 3 cutting through the long axis 4. The dimensions of this typical device are 0.3 centimeter by 0.09 centimeter by 0.10 centimeter. In preparation, end faces 4 and 5 were copper-plated and tinned, one face 6 was ground on 600 Alundum on glass and the whole was etched in an aqueous solution of hydrogen fluoride and hydrogen peroxide as described in United States Patent No. 2,542,727 to H. C. Theuerer, issued December 29, 1949. Face 6 is used for photoexamination and for application of point contact.

It is to be understood that the above dimensions are only typical of the devices which have been built in accordance with this invention and are not critical. Increasing the dimensions perpendicular to the longitudinal axis has the result of increasing the current capacity of the device depicted. An increase in length results in an increase in the ohmic resistance of the device. It is to be preferred that the lifetime of the material from which this device is constructed be of the order of 100 microseconds or more, although lower lifetime materials have been used. In this connection it is conceivable that in certain applications lower lifetime materials may be preferred so that materials having lifetimes of below 10 microseconds may be preferred in high frequency applications. Although electrodes 4 and 5 have been described as copper-plated, electrical connection may be made by other means.

As is well known in the semiconductor art, an appreciable number of generated hole-electron pairs recombine so that they do not contribute to the current-carrying characteristics of the device under consideration. It is further known that in the untreated semiconductor devices the surface recombination rate is greater than that in the body. To minimize this difficulty there have been developed several types of surface treatment designed to prevent this surface recombination. The treatment with an aqueous solution of hydrogen fluoride and hydrogen peroxide, known as the superoxol etch method, has been mentioned. An alternate process for etching is described in the copending application of R. D. Heidenreich Serial No. 164,303, filed May 25, 1950. This or any other process which lessens the surface recombination rate is useful in the manufacture of the devices of this invention. In addition to the processes mentioned for decreasing the surface recombination rate, there has been developed a surface treatment which has the effect of increasing the lifetime of generated carriers. This treatment involves the application of antimony oxichloride and is described in the copending application of J. R. Haynes, Serial No. 175,648, filed July 24, 1950.

Figure 2:
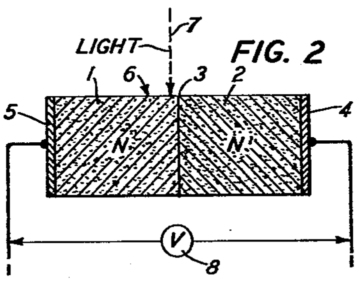
Fig. 2 is a cross-sectional view of such a device.

In Fig. 2 the device of Fig. 1 is used in combination with exploring light spot 7 moving longitudinally between electrodes 4 and 5 and perpendicular to face 6. Photovoltages measured across electrodes 4 and 5 on voltmeter 8 and produced by a 0.002 inch diameter light spot will be discussed in connection with Fig. 9.

Figure 3:
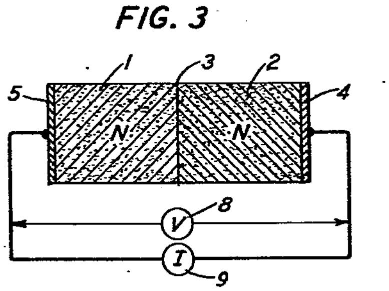
Fig. 3 is a cross-sectional view of such a device together with meters for measuring D. C. current voltage characteristics.

In Fig. 3 the current-voltage characteristics of the active natural grain boundary 3 of the device of Fig. 1 are measured by means of voltmeter 8 and ammeter 9. The characteristics of the specimen in the circuits of Fig. 3 are discussed in connection with Fig. 10.

Figure 4:
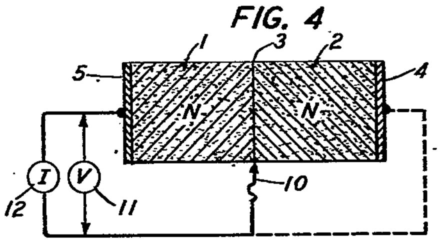
Fig. 4 is a cross-sectional view of such a device in such a circuit that the D. C. rectifying characteristic on each of the boundaries may be measured.

With the circuit of Fig. 4, the device of Fig. 1 together with a point contact 10 making contact with grain boundary 3 it is demonstrated that each PN barrier of the NPN transition region 3 behaves as a rectifier. The current-voltage characteristics using point 10 and first face 5 and then face 4 as the second electrode, are shown on Fig. 11. Voltage and current readings are made on meters 11 and 12. The rectifying characteristics of the device of Fig. 4 are discussed in connection with Fig. 11.

Figure 5:
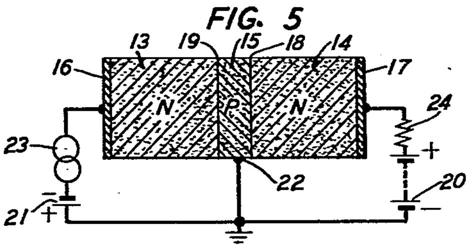
Fig. 5 is a cross-sectional view of an NPN transistor made in accordance with this invention.

A transistor having two N-type regions separated by a thin P region has been described and claimed in United States Patent No. 2,569,347, issued September 25, 1951. Since an active grain boundary specimen approximates this geometry, a specimen similar to Fig. 1 is set up as such a transistor. This transistor is depicted in Fig. 5 with grain boundary P region 15 intermediate N regions 13 and 14. In the arrangement shown in Fig. 5, the P region 15 is regarded as the transistor base, N region 13 with face 16 is regarded as the emitter and N region 14 with face 17 is regarded as the collector. N region is biased positively with respect to base 15 and hence PN boundary 18 is biased in the high impedance direction. N region 13 is preferably biased negatively so that PN boundary 19 is of low impedance.

For reasons of convenience, in Fig. 5 the thickness of the P region has been shown enlarged many times so that reference can be made to the two PN boundaries. Positive bias on N region 14 is provided by battery 20 and negative bias on N region 13 by battery 21. Base connection to P region 15 is made by means of point 22. Using alternating-current source 23 and load resistance 24, it is possible to measure the parameters of the equivalent network $I_1$, $I_2$, $V_1$, $V_2$, $R_{12}$, $R_{11}$, $R_{22}$, and $R_{21}$, and values of $\alpha$ may be computed. The nature of this equivalent network and the parameters are fully described in the book of W. Shockley referred to above.

Figure 6:
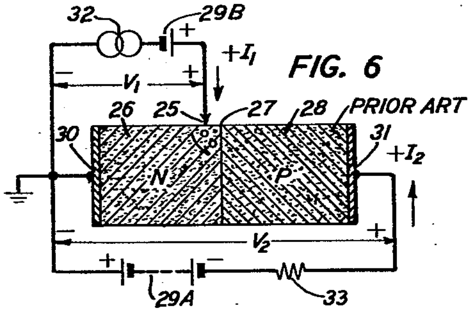
Fig. 6 is a cross-sectional view of a PN transistor.

A second type of transistor known to the art and described in United States Patent No. 2,502,488, granted to W. Shockley April 4, 1950, is depicted in Fig. 6. This type of transistor has a point contact emitter 25 placed on the N region 26 in the vicinity of PN boundary 27 which boundary is between N region 26 and P region 28. PN boundary 27 is biased in the reverse direction by means of battery 29A so that the P region 28 is negative in respect to N region 26 and point contact 25 is made positive in respect to base electrode 30 by means of battery 29B. High impedance terminal 31 serves as the collector. Holes generated by signal source 32 are injected into N region 26 at point contact 25 and are drawn across boundary 27 into the high impedance collector circuit containing load resistance 33.

The device of Fig. 6 is illustrative of that type of transistor known in the art as a "junction transistor" by which is meant that either emitter and/or collector contact is made by means of a PN junction rather than by a point or other rectifying means. Since the devices of this invention all utilize at least one interface between an N region and a natural grain boundary, the boundary showing P-type conductivity, as an emitter or collector contact, the devices of this invention may be classified as junction transistors.

Figure 7:
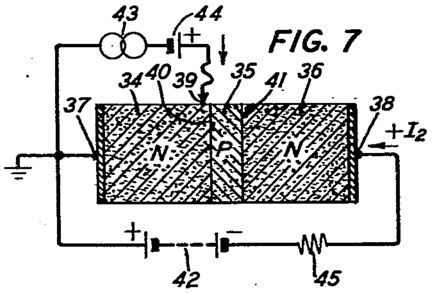
Fig. 7 is a cross-sectional view of a device containing a natural grain boundary, biased so as to have the characteristics of the device of Fig. 6 in a grounded base circuit.

In Fig. 7 a specimen such as that depicted in Fig. 1 is biased so as to produce the transistor action of the device of Fig. 6. The specimen contains consecutively N, P and N regions 34, 35 and 36 and as shown utilizes base connection 37, collector connection 38 and point contact emitter 39. PN boundary 40 is the one of interest. The second PN boundary 41 plays no part in the transistor action, and the N region 36 beyond it is merely a "handle" through which contact is made to P region 35. The bias polarity for the collector 38 is opposite from that of the device of Fig. 5 being kept negative in respect to base 37 by battery 42. The complete circuit utilizes signal source 43 and emitter biasing battery 44 so that the emitter is positive with respect to base 37 as in the device of Fig. 6. Load resistor 45 completes the circuit. The device operates most effectively with emitter point 39 in contact with N region 34 and within a few mils of grain boundary 35, transistor action in this particular specimen being observed from positions of the emitter point 39 at distances as great as 10 mils from grain boundary 35.

Table I is a tabulation of measurements made on a natural grain boundary transistor biased in accordance with the device of Fig. 7, using the current and voltage conventions reported in the above-cited reference to "Electrons and Holes in Semiconductors." It is seen that power gains (calculated as $\alpha^2 R_{22}/4R_{11}$) of up to 14 decibels are obtained. Under certain conditions $\alpha$'s of up to 1, indicating a collection of all holes generated, are obtained. The tabulation of readings made on this device together with resultant $\alpha$ values follow:

TABLE I

*Transistor impedances, grounded-base connection*

| | $I_1$ | $I_2$ | $V_1$ | $V_2$ | $R_{12}$ | $R_{11}$ | $R_{22}$ | $R_{21}$ | $\alpha$ | Power Gain (db) |
|---|---|---|---|---|---|---|---|---|---|---|
| a | +1.50 | −0.6 | +.80 | ~−1 | 140 | 350 | 860 | 300 | 0.35 | -------- |
| b | +1.25 | −0.6 | +.71 | ~−1 | 140 | 360 | 1,050 | 370 | .35 | -------- |
| c | +1.0 | −0.6 | -------- | -------- | 140 | 380 | 34,000 | 14,500 | .43 | 6 |
| d | +.75 | −0.6 | +.52 | −9 | 210 | 460 | 120,000 | 77,000 | .64 | 14 |
| e | +.50 | −0.6 | +.37 | −25 | 640 | 950 | 120,000 | 86,000 | .72 | 11 |
| f | +.39 | −0.6 | 0 | −33 | 4,800 | 12,600 | 123,000 | 112,000 | .91 | 3 |
| g | +.31 | −0.6 | −4.5 | −45 | 93,000 | 115,000 | 142,000 | 143,000 | 1.0 | −6 |
| h | +.20 | −0.6 | −23 | −60 | 93,000 | 153,000 | 120,000 | 120,000 | 1.0 | -------- |

Figure 8:
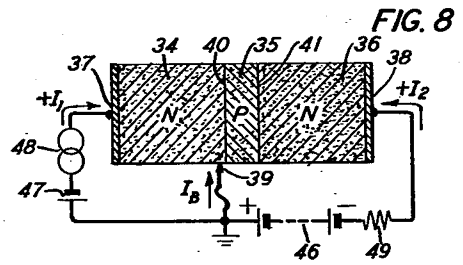
Fig. 8 is a cross-sectional view of a device similar to that of Fig. 7 in a grounded emitter circuit.

In the circuit of Fig. 8 the device of Fig. 7 is connected with emitter grounded. N, P and N regions 34, 35 and 36, base and collector connections 37 and 38, emitter point 39 and PN boundaries 40 and 41 remain unchanged. In this circuit the ground connection has been switched from base 37 to emitter 39. Collector 38 is again biased negatively by battery 46 and base 37 is biased negatively by battery 47, both in regard to emitter 39. Signal source 48 and load resistance 49 complete the circuit. With the assistance of the tabulated readings made on the device in the circuit of Fig. 8 as shown in Table II and by comparison with Table I, it may be shown that the transistor action of the device of the circuit of Fig. 7 is due to injection of holes by point electrode 39. In the circuit of Fig. 8 impedances are measured using point 39 and electrode 37 as output terminals at the same values of bias current through each electrode as in (*a*) to (*e*) of Table I. The data as given in Table II shows power gains of up to 19 decibels (calculated again as $\alpha^2 R_{22}/4R_{11}$). Values for $\alpha$ (defined as $R_{21}/R_{22}$) of up to 7.0 are reported.

TABLE II

*Transistor impedances, grounded-emitter connection*

| | $I_1$, ma. | $I_2$ ma. | $I_B$* $=-(I_1+I_2)$ | $V_1$, v. | $V_2$, v. | $R_{12}$, ohms | $R_{11}$, ohms | $R_{22}$, ohms | $R_{21}$, ohms | $\alpha$ | Power Gain (db) |
|---|---|---|---|---|---|---|---|---|---|---|---|
| a | −0.9 | −0.60 | +1.50 | −.81 | ~−1 | 210 | 350 | 750 | 50 | -------- | -------- |
| b | −0.65 | −0.60 | +1.25 | −.72 | −1 | 225 | 360 | 850 | <10 | -------- | -------- |
| c | −.40 | −0.60 | +1.0 | −.63 | −2 | 260 | 390 | 17,500 | 18,000 | 1.0 | 10 |
| d | −.15 | −0.60 | +.75 | −.52 | −12 | 265 | 460 | 60,000 | 88,000 | 1.47 | 18 |
| e | +.10 | −0.60 | +.50 | 0.40 | −28 | 290 | 930 | 32,000 | 92,000 | 2.9 | 19 |
| f | +.19 | −0.60 | -------- | 0 | −35 | 590 | 7,000 | 15,000 | 105,000 | 7.0 | 13 |

* $I_B$ in this table corresponds to $I_1$ In Table I.

The impedances of the grounded emitter connection of Fig. 8 are related to those for the grounded base connection of Fig. 7 by the following relationships:

| | | | | |
|---|---|---|---|---|
| Grounded Base | $R_{12}$ | $R_{11}$ | $R_{22}$ | $R_{21}$ |
| Grounded Emitter | $(R_{11}-R_{12})$ | $R_{11}$ | $(R_{22}-R_{21}+R_{11}-R_{12})$ | $R_{11}-R_{21}$ |

Upon transforming the data of Table II and comparing it with data for the corresponding values of bias current taken from Table I, it is found that the measured and transformed values are alike, within experimental error. Table III shows the comparison. It is concluded that the $\alpha$'s greater than 1 in Table II are a circuit effect and do not represent current multiplication at the collector.

TABLE III

| | Table | $R_{12}$ | $R_{11}$ | $R_{22}$ | $R_{21}$ |
|---|---|---|---|---|---|
| a | (I) | 210 | 350 | 750 | 50 |
| | (II) | 210 | 350 | 770 | +50 |
| b | (I) | 225 | 360 | 850 | <10 |
| | (II) | 220 | 360 | 900 | −10 |
| c | (I) | 260 | 390 | 17,500 | 18,000 |
| | (II) | 240 | 380 | 19,700 | −14,100 |
| d | (I) | 265 | 460 | 60,000 | 88,000 |
| | (II) | 250 | 460 | 43,200 | −76,500 |
| e | (I) | 290 | 930 | 32,000 | 92,000 |
| | (II) | 310 | 950 | 34,300 | −85,100 |

Figure 9:
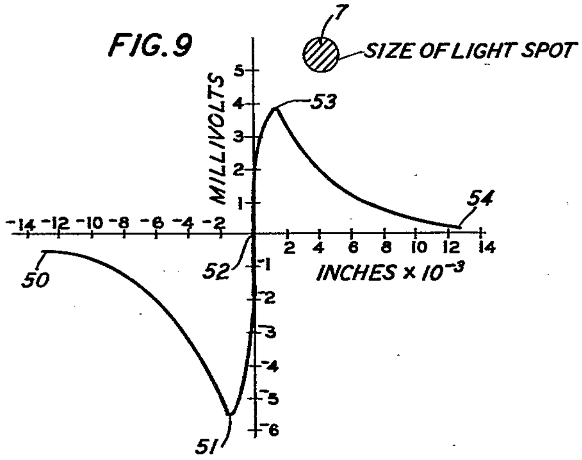
Fig. 9 is a plot of the photovoltage obtained on the device of Fig. 2 in coordinates of millivolts against the distance from the NPN boundary in mils and represents the photovoltage method referred to above for determination of active grain boundaries.

Fig. 9 is a plot of open circuit photovoltage in millivolts against distance in mils from boundary 3 of exploring light spot of 0.002 inch in diameter, the light being directed perpendicularly to treated face 6 of the device of Fig. 2. Following curve 50—51—52—53—54, it is seen that a negligible number of the hole-electron pairs generated at a distance of 15 mils or more from and to either side of the NPN boundary, are separated by the fields of the PN barriers at the boundary. This distance is only typical and may vary with the material used depending primarily on the carrier lifetime. Reading from left to right, advancing from point 50 to 51, it is seen that in an absolute sense the photovoltage increases gradually until the exploring spot is at a distance of a little over 2 mils from the boundary after which it drops rapidly to a zero value at point 52 coinciding with the center of the NPN boundary. At point 52 hole-electron pairs are generated at both sides of the boundary so that the over-all effect is one of cancellation, the numbers of generated holes passing over the boundary into the opposite N regions being equal. The rapidity with which the generated photovoltage drops off between points 51 and 52 may be controlled to some extent by controlling the size of the exploring spot 7, so that with a smaller spot peak 51 would occur somewhat closer to the NPN boundary and the voltage would drop off more severely between 51 and 52.

As light spot 7 crosses NPN boundary 3 the generated voltage is of the opposite polarity so that a peak generated voltage occurs at point 53 also a little under 2 mils distant from the NPN boundary. This generated voltage drops off gradually between 53 and 54 and again at about 15 mils from the NPN boundary the transition to normal germanium is substantially complete so that only an insignificant number of the generated holes reach the NPN boundary. The method of Fig. 9 is a useful one as indicated above for determining the location of and the activity of grain boundaries.

Fig. 10, which is a plot of voltage against milliamperes for readings taken on the circuit of Fig. 3, illustrates that the specimen may be regarded as having two PN barriers placed back to back with the grain boundary between them. Since a PN boundary is rectifying, this arrangement is essentially two rectifiers in series opposition. The current voltage DC characteristic of Fig. 10 which is non-rectifying shows this to be the case. For each polarity the current is limited by the PN barrier which is biased in the reverse direction, that is, in which the P region is negative in respect to the adjoining N region. Curve 55 represents readings made on the device in the circuit of Fig. 3 with face 5 biased negatively while curve 56 represents readings made on the same device with face 5 biased positively. At 40 volts the currents through the specimen are of the order of 0.03 ampere per square centimeter. The actual resistance of the boundary is about 150,000 ohms at 40 volts. Since the two curves 55 and 56 show a slight separation, it is seen that the NPN boundary on which the readings are made is not quite symmetrical. This dissymmetry shows up on Fig. 9 as a difference in absolute values of peak voltage depending on whether the hole-electron pairs are being generated in one N region or the other.

Fig. 11 is a plot of voltage against milliamperes for the device in the circuit of Fig. 4. It is seen from this plot that each PN barrier behaves as a rectifier, rectification taking place first between a Phosphor bronze point 10 on Fig. 4 and face 5 and again between point 10 and face 4. These current-voltage characteristics are of the rectifying type. Curve 57 of this figure represents that circuit in which point 10 is negative and face 5 is used as the base. Curve 58 represents point 10 biased negatively with 4 as the base. Curve 59 represents the point biased positively with face 4 as the base and curve 60 represents that configuration in which the point is biased positively and face 5 is used as the base. While it is believed that some rectification occurs between the point and the P-type region 3, the polarity of the curves indicates that the observed shapes are due to the PN junctions of the natural NPN grain boundary.

Ideally, in the devices described, contact to or adjacent the grain boundary is by means of point or bond of material which does not contain donors. Where the contact serves as an emitter as does contact 39 in Fig. 7, the presence of donors impairs the ability of the contact to emit holes, and where the contact serves as a base as does contact 22 of Fig. 5, donors cause the contact to be rectifying. To minimize these effects it is desirable to use materials containing acceptors. Examples are point contacts made of or containing gold, copper, or a metal of group 3 of the periodic table and gold or aluminum bonds.

Two kinds of transistor action that are produced using the NPN configuration of an active natural grain boundary in germanium are described. It is seen that in the arrangement of Figs. 7 and 8, usable power gains are obtained. It is further seen that by using a point contact at or near the active natural grain boundary, it is possible to use either or both PN barriers separately or together to obtain transistor action.

The advantages of the utilization of the processes described herein are self-evident. Without the use of expensive and critical laboratory equipment and/or processes, it is possible to produce material which, when utilized in the devices described herein, results in transistor action as good as that reported for transistors known to the art. Further, the devices constructed of this material have the advantage of simplicity of construction in that they require only one point contact. The devices of this invention are more stable than point contact transistors because they do not have pressure-contact collector points.

The point contact used as an emitter in all of the devices described is not critical as to stability as it is not formed. A bonded gold or aluminum point may be substituted for the point-type emitter described.

The devices herein described have an advantage over the point-type transistor in that there is a greater allowable power dissipation in the collector due to the large area of the PN barrier.

What is claimed is:

1. A junction type transistor consisting of a body of germanium comprising two N-type conductivity regions separated by and adjacent to a natural grain boundary, and having emitter contact to one N-type region and collector contact to the second N-type region and a third electrode making electrical contact with the grain boundary, in which the natural grain boundary is one which occurs naturally in a standard N-type germanium ingot.

2. A junction type transistor as described in claim 1 wherein the emitter and collector contacts are of the non-rectifying type.

References Cited in the file of this patent

UNITED STATES PATENTS

| | | |
|---|---|---|
| 2,504,627 | Benzer | Apr. 18, 1950 |
| 2,603,694 | Kircher | July 15, 1952 |
| 2,623,102 | Shockley | Dec. 23, 1952 |
| 2,623,103 | Kircher | Dec. 23, 1952 |
| 2,623,105 | Shockley | Dec. 23, 1952 |
| 2,728,034 | Kurshan | Dec. 20, 1955 |